United States Patent [19]
Liron

[11] Patent Number: 6,130,725
[45] Date of Patent: Oct. 10, 2000

[54] SWITCHING REFERENCE GENERATION USING A SCANNING SYNC SEPARATOR

[75] Inventor: John E. Liron, Rough & Ready, Calif.

[73] Assignee: Grass Valley (U.S.) Inc., Nevada City, Calif.

[21] Appl. No.: 08/924,752

[22] Filed: Sep. 5, 1997

[51] Int. Cl.$^7$ ............ H04N 5/268; H04N 9/74; H04N 7/11; H04N 11/20
[52] U.S. Cl. ............ 348/705; 348/706; 348/584; 348/585
[58] Field of Search ............ 348/705, 706, 348/584, 585, 443, 441, 460, 454, 458, 525; H04N 5/268, 9/74, 7/01, 11/20

[56] References Cited

U.S. PATENT DOCUMENTS

| | | | |
|---|---|---|---|
| 4,743,958 | 5/1988 | Bannister et al. | 348/441 |
| 5,521,647 | 5/1996 | Hyakutake | 348/705 |
| 5,781,250 | 7/1998 | Jun | 346/705 |
| 5,808,693 | 9/1998 | Yamashita et al. | 348/706 |
| 5,808,702 | 9/1998 | Yoshinobu et al. | 348/706 |
| 5,896,181 | 4/1999 | Takamori | 348/705 |

*Primary Examiner*—Nathan Flynn
*Assistant Examiner*—Vivek Srivastava
*Attorney, Agent, or Firm*—Francis I. Gray

[57] ABSTRACT

An architecture for switching reference generation uses a scanning sync separator to sample each output from the matrix outputs in turn to determine the format of each output. A controller selects an appropriate switch reference signal from among a plurality of switch reference signals according to the determined format and applies such selected switch reference signal to a crosspoint switch corresponding to the matrix output so that subsequent switches between matrix inputs are synchronous.

6 Claims, 4 Drawing Sheets

SWITCHING REFERENCE GENERATION USING A SCANNING SYNC SEPARATOR

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to the switching of video signals, and more particularly to switching reference generation using a scanning sync separator for switching between video signals of different formats or sync timings.

Existing SMS7000 Video Matrices, manufactured by the Grass Valley Product Group of Tektronix, Inc., only deal with one vertical sync switching reference. This reference is used to define the vertical interval switching point, that is, the point in time where the switch from one signal to another occurs. However a need exists to switch groups of signals having different sync timings in the same video switch matrix, such as systems having both 525 line/60 Hz and 625 line/50 Hz signals or systems containing groups of signals of the same television standard that are asynchronous to one another.

An ideal solution would be to decode vertical sync from each output and use this to generate a unique vertical switching reference for the crosspoint switch that drives the respective outputs. This means that, if a signal present at a crosspoint input is synchronous with the signal currently present at the crosspoint output, a switch to that input is by implication synchronous. A block diagram illustrating this approach is shown in FIG. 1. This architecture is well established and widely used in routing switchers. In analog systems the added cost of a sync separator for each output is relatively insignificant, but with serial digital video routing switchers it is necessary to convert the serial bitstream into the parallel domain in order to detect vertical sync. In a routing switcher containing multiple outputs (destinations), the size, cost and power consumption required to implement this architecture is considerable.

What is desired is a switching reference generation architecture for multiple format or sync timing video signals that minimizes the size, cost and power consumption required to perform the switching function.

BRIEF SUMMARY OF THE INVENTION

Accordingly the present invention provides switching reference generation using a scanning sync separator for switching between video signals of different formats or sync timings. A plurality of crosspoint switches have a plurality of matrix inputs, each crosspoint switch providing a matrix output. Each matrix output is sampled by a sampling sync separator in turn under control of a controller. The controller matches the output from the sampling sync separator with a switching reference, and applies the selected switching reference to the particular crosspoint switch providing the currently sampled matrix output.

The objects, advantages and other novel features of the present invention are apparent from the following detailed description when read in conjunction with the appended claims and attached drawing.

DETAILED DESCRIPTION OF THE INVENTION

As a rule non-synchronous switches occur much less frequently than synchronous switches. This is borne out in practice: asynchronous switches usually take place when a device or room (edit suite) is changing synchronization standards (525/60 to 625/50) or when a shared resource is switched from one user to another where the users may not be sharing a common synchronization reference. Therefore asynchronous switches are assumed to be part of set-up activity. Synchronous switches on the contrary are assumed to be the primary operating mode during normal operations, such as an editing session. Based upon these assumptions a sampling system to detect the signal format present at each matrix output and use of this information is used to select an appropriate switching reference.

Figure 1:
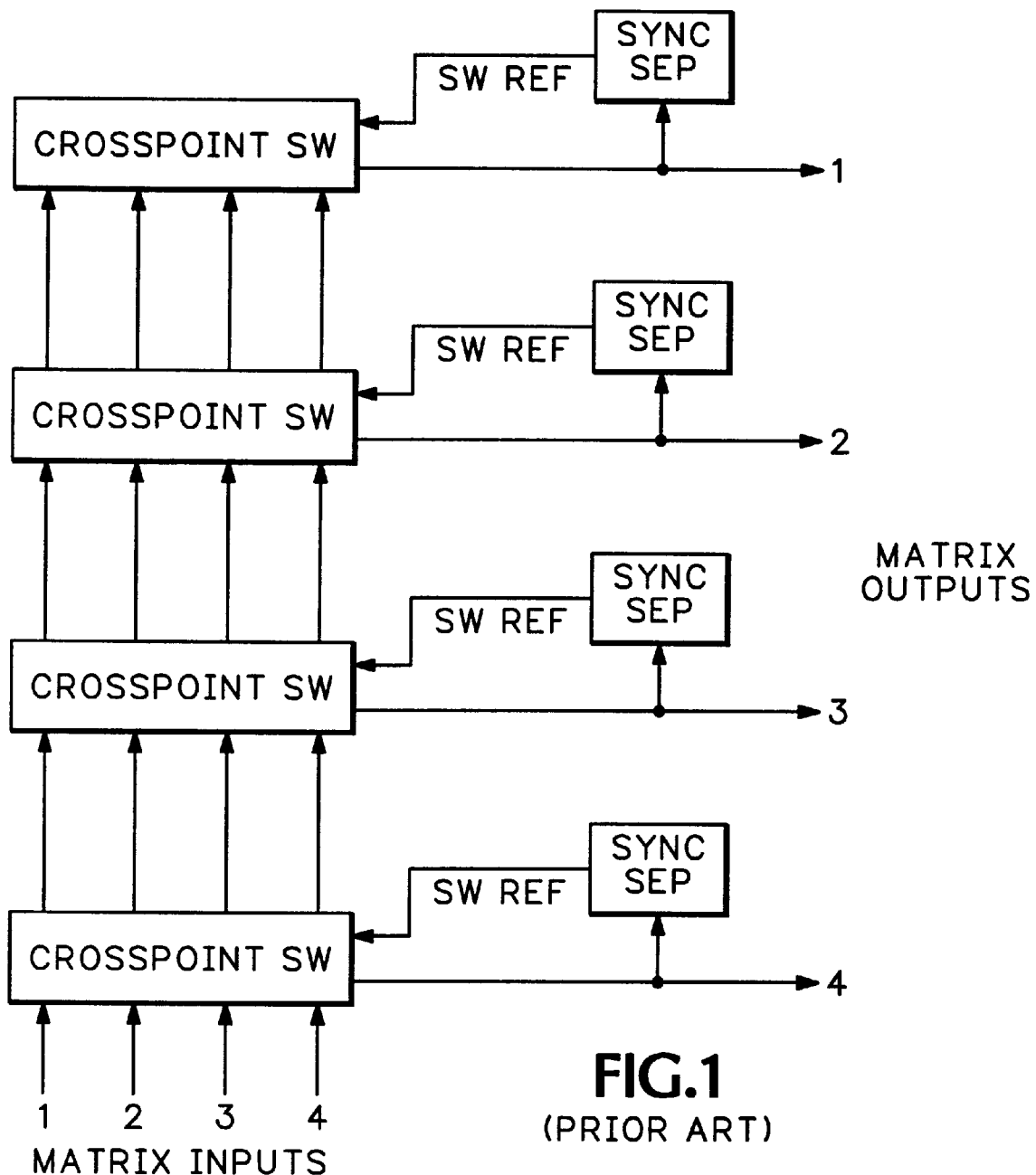
FIG. 1 is a block diagram view of an analog switching matrix according to the prior art.
Figure 2:
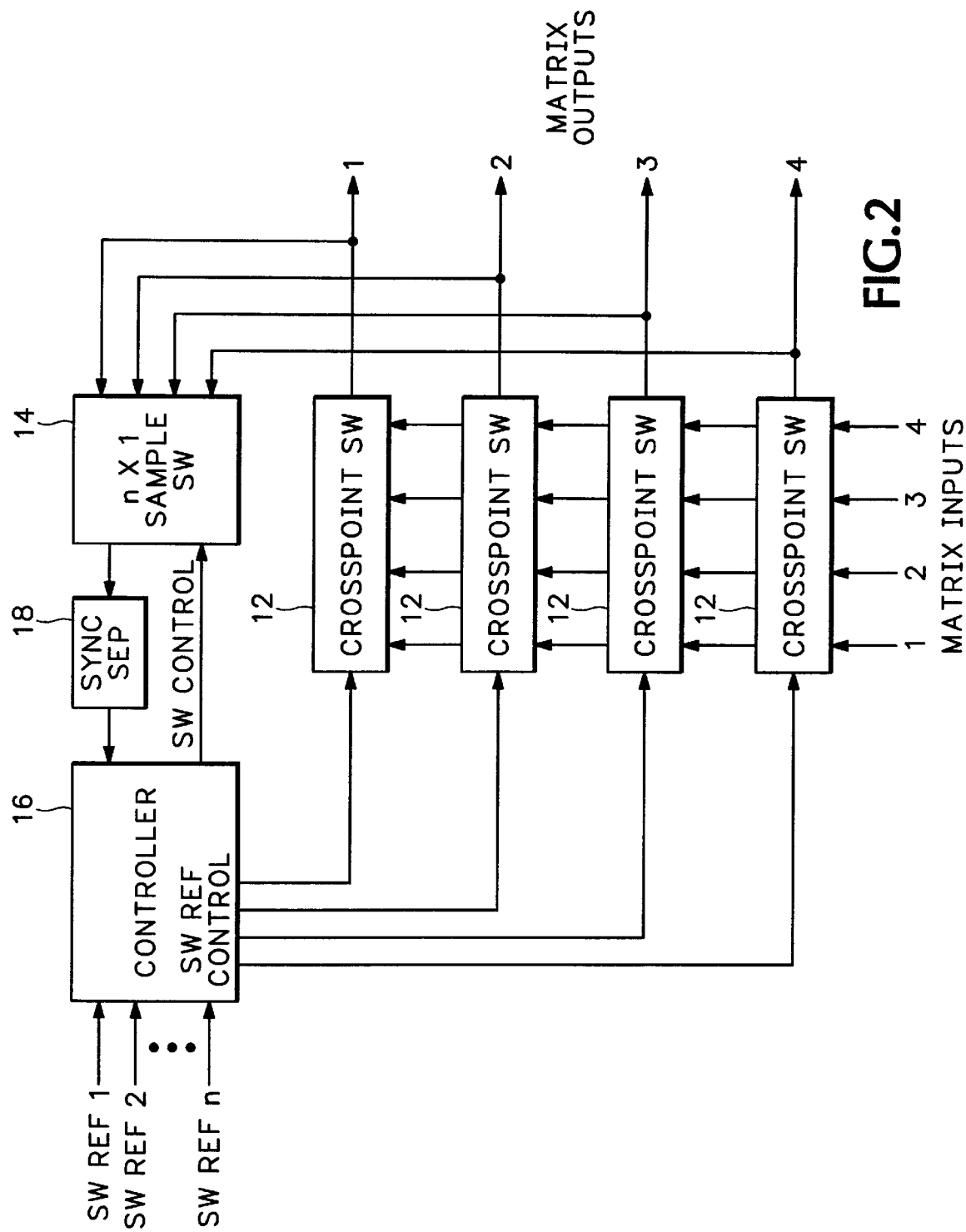
FIG. 2 is a block diagram view of a switching reference generation architecture using a scanning sync separator according to the present invention.

Referring now to FIG. 2 a plurality of crosspoint switches 12 each have a plurality of video signals coupled as matrix inputs, and each provides one of a matrix of outputs. Each matrix output is coupled to a sampling switch 14 which samples each output in turn under the control of a controller 16. The selected output from the sampling switch 14 is input to a sync separator 18. The sync output from the sync separator 18 is coupled to the controller 16 which then selects a correct switch reference signal from among a plurality of switch reference signals (Sw Ref 1, 2, . . . n) that allows synchronous switching. The selected switch reference signal is coupled to the appropriate crosspoint switch 12. If a new matrix input that is synchronous with the currently selected matrix input at a crosspoint switch 12 is switched to the matrix output, the switch occurs synchronously in the vertical interval. If the new matrix input is not synchronous, an asynchronous switch occurs. At this point the new matrix input is routed to the matrix output where it is sampled by the scanning sync separator 14, 18 which then passes the new signal format information to the controller 16 which in turn supplies the new switching reference signal to the crosspoint 12. All subsequent switches to matrix inputs that are synchronous with the new matrix input occur synchronously.

Figure 3:
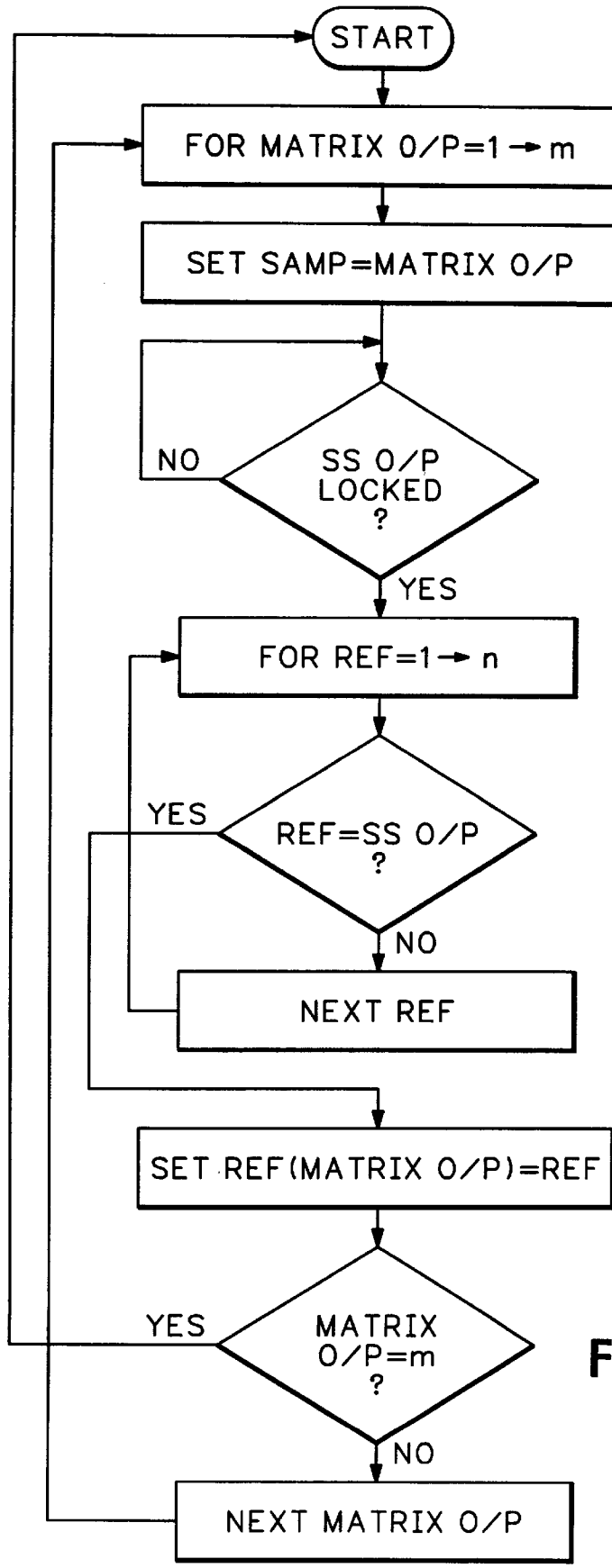
FIG. 3 is a flow chart diagram view for the switching reference generation according to the present invention.

Referring now to FIG. 3 the operation of the controller 16 is illustrated. For each matrix output from one to m the controller 16 sets the sampling switch 14 to the currently selected matrix output and feeds the selected output to the input of the sync separator 18. The output of the sync separator 18 is tested to determine if there is a valid signal being produced from the input signal from the sample switch 14. If the signal is valid from the sync separator 18, the controller 16 selects each switching reference one to n in turn, and compares the selected switching reference with the output from the sync separator. When a match occurs, the currently selected switching reference is synchronous with the current matrix output, and thus is used for the crosspoint switch 12 that corresponds to the current matrix output. Each matrix output in turn is tested in the same manner.

Figure 4:
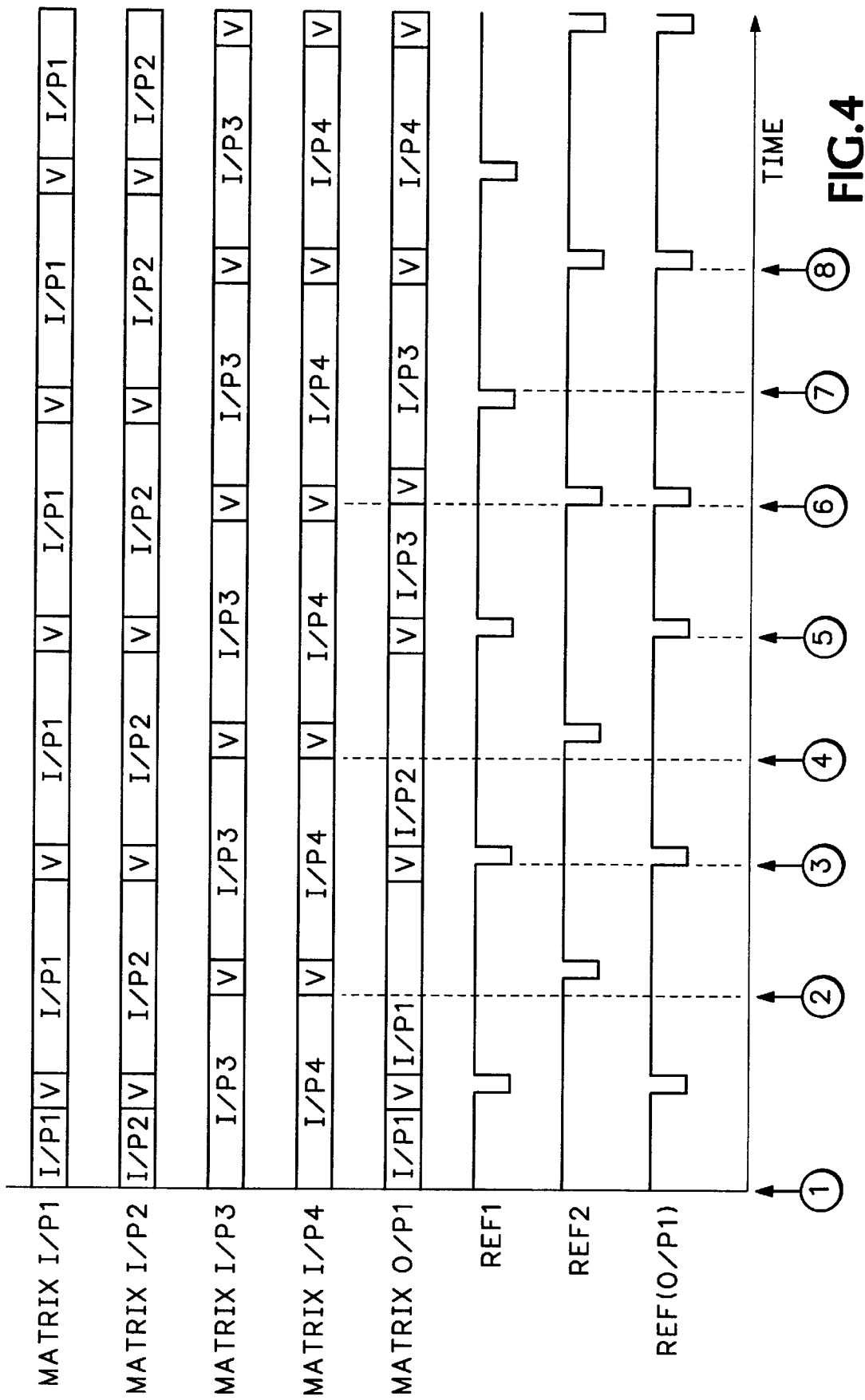
FIG. 4 is a timing diagram view for the switching reference generation according to the present invention.

The timing diagram shown in FIG. 4 illustrates the behavior of matrix output 1 when it is initially coupled to matrix input 1 for the following three cases:

1. Matrix o/p 1 switched from matrix i/p 1 to matrix i/p 2, which is synchronous with matrix i/p 1.
2. Matrix o/p 1 switched from matrix i/p 2 to matrix i/p 3, which is asynchronous with matrix i/p 2.
3. Matrix o/p 1 switched from matrix i/p 3 to matrix i/p 4, which is synchronous with matrix i/p 3.

"V" represents the vertical timing interval during which synchronous switching occurs.

When matrix i/p 1 is coupled to matrix o/p 1, matrix o/p 1 uses Ref 1 as the switching reference. Matrix o/p 1 is then commanded to switch from matrix i/p 1 to matrix i/p 2. Matrix o/p 1 switches to matrix i/p 2 using the Ref 1 switching reference and, since the matrix i/p's 1 and 2 are in sync with each other and Ref 1, the switch occurs synchronously in the vertical interval. When the sync separator 18 resamples matrix o/p 1, it determines that Ref 1 is still the appropriate, synchronous, switching reference. Matrix o/p 1 subsequently is commanded to switch its input from matrix i/p 2 to matrix i/p 3. Matrix o/p 1 switches to matrix i/p 3 using the Ref 1 switching reference. Because matrix i/p 3 is not synchronous with matrix i/p 2, the switch is asynchronous. The sync separator 18 samples matrix o/p 1 and determines that the output is now synchronous with Ref 2, and therefore changes the switching reference applied to matrix o/p 1 to be Ref 2, as indicated by Ref(o/p 1). Finally matrix o/p 1 is commanded to switch its input from matrix i/p 3 to matrix i/p 4. Matrix o/p 1 uses Ref 2 to switch to matrix i/p 4 and, since matrices i/p 3 and 4 are synchronous, the switch occurs in the vertical interval. When the sync separator 18 resamples matrix o/p 1, it determines that Ref 2 is still the correct switching reference.

Thus the present invention provides an architecture for switching reference generation using a scanning sync separator that samples each matrix output in turn and determines the signal format for each, and then provides the appropriate switch reference signal from among a plurality of such signals to each crosspoint switch to allow synchronous switching.

What is claimed is:

1. A switching architecture of the type having a plurality of crosspoint switches, each having common multiple inputs and a single output, comprising:

a scanning sync separator having the crosspoint switch outputs as inputs and providing a signal format output representing a format for each of the outputs; and a controller having as inputs the scanning sync separator signal format output and a plurality of switching reference signals for various formats and providing as outputs a selected one of the switching reference signals for each of the crosspoint switches corresponding to the format indicated by the scanning sync separator signal format output.

2. The architecture as recited in claim 1 wherein the scanning sync separator comprises:

a sampling switch controlled by the controller having the crosspoint switch outputs as inputs and providing a sampled output representing the crosspoint switch outputs; and a sync separator having an input coupled to the output of the sampling switch to receive the sampled output and provide as an output the signal format output.

3. A method of switching between video signals having different formats using a routing switcher having common matrix inputs to each of a plurality of crosspoint switches, each crosspoint switch having a single output to form matrix outputs, comprising the steps of:

sampling each crosspoint switch output in turn to determine the format of each output;

selecting from among a plurality of switching reference signals a switching reference signal corresponding to the determined format; and applying the selected switching reference signal to the corresponding crosspoint switch to allow synchronous switching between matrix inputs of the same format.

4. The method as recited in claim 3 wherein the sampling step comprises the steps of:

scanning the outputs from the crosspoint switches in turn in response to a control signal to provide a segmented crosspoint switch output signal; and determining for each segment of the segmented crosspoint switch output signal the format corresponding to that segment for input to the selecting step.

5. An architecture for switching between video signals having different formats using a routing switcher having common matrix inputs to each of a plurality of crosspoint switches, each crosspoint switch having a single output to form matrix outputs, comprising:

means for sampling each crosspoint switch output in turn to determine the format of each output;

means for selecting from among a plurality of switching reference signals a switching reference signal corresponding to the determined format; and means for applying the selected switching reference signal to the corresponding crosspoint switch to allow synchronous switching between matrix inputs of the same format.

6. The architecture as recited in claim 5 wherein the sampling means comprises:

means for scanning the outputs from the crosspoint switches in turn in response to a control signal to provide a segmented crosspoint switch output signal; and means for determining for each segment of the segmented crosspoint switch output signal the format corresponding to that segment for input to the selecting means.

* * * * *